United States Patent
Rao et al.

(10) Patent No.: US 11,322,004 B2
(45) Date of Patent: May 3, 2022

(54) METHOD AND A SYSTEM FOR DETERMINING SAFE EVACUATION PATH/S

(71) Applicant: Carrier Corporation, Palm Beach Gardens, FL (US)

(72) Inventors: Venkat Rao, Hyderabad (IN); Bharat Kumar Vundi, Hyderabad (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/114,050

(22) Filed: Dec. 7, 2020

(65) Prior Publication Data
US 2021/0183219 A1    Jun. 17, 2021

(30) Foreign Application Priority Data
Dec. 11, 2019  (IN) .............................. 201911051254

(51) Int. Cl.
| | |
|---|---|
| G08B 1/08 | (2006.01) |
| G08B 7/06 | (2006.01) |
| H04W 4/024 | (2018.01) |
| G08B 17/10 | (2006.01) |

(52) U.S. Cl.
CPC ............ G08B 7/066 (2013.01); G08B 17/10 (2013.01); H04W 4/024 (2018.02)

(58) Field of Classification Search
CPC ........ G08B 7/066; G08B 17/10; H04W 4/024
USPC ......................................... 340/539.1, 539.13
See application file for complete search history.

(56) References Cited

U.S. PATENT DOCUMENTS

| | | | | |
|---|---|---|---|---|
| 6,646,545 B2* | 11/2003 | Bligh | ..................... | G08B 7/062 |
| | | | | 340/286.05 |
| 9,080,883 B2* | 7/2015 | Frey | ...................... | G08B 7/066 |
| 9,129,498 B2* | 9/2015 | Wedig | .................. | G08B 25/004 |
| 9,257,023 B2* | 2/2016 | Lee | ......................... | G08B 7/066 |
| 9,681,280 B2* | 6/2017 | Balthasar | ............... | H04W 4/33 |
| 9,898,912 B1* | 2/2018 | Jordan, II | ............. | G08B 17/10 |
| 9,980,111 B2* | 5/2018 | Miyata | ................... | G08B 25/10 |

(Continued)

FOREIGN PATENT DOCUMENTS

PL          195861 B1        10/2007

OTHER PUBLICATIONS

Cheng, Min-Yuan, et al., "BIM integrated smart monitoring technique for building fire prevention and disaster relief", Department of Civil and Construction Engineering, National Taiwan U. of Science and Technology, 2017, 11 pages.

(Continued)

*Primary Examiner* — Zhen Y Wu
(74) *Attorney, Agent, or Firm* — Cantor Colburn LLP (57) ABSTRACT

A system and a method for determining one or more safe evacuation paths in an event of fire. A method includes receiving measurements of parameter/s from one or more detectors. The one or more detectors detect parameter/s in an event of fire in a premises and are positioned at each of a plurality of evacuation paths inside the premises. The method further includes determining one or more safe evacuation paths from the plurality of evacuation paths inside the premises based on the measurements of the parameter/s. The method also includes displaying an indication of each of the one or more safe evacuation paths on an interface of a user device based on the determination.

12 Claims, 5 Drawing Sheets

(56) References Cited

U.S. PATENT DOCUMENTS

| | | | |
|---|---|---|---|
| 10,026,278 B1* | 7/2018 | Asaro | G08B 7/062 |
| 10,473,471 B2* | 11/2019 | Imoto | G08B 7/062 |
| 10,621,839 B2* | 4/2020 | Vazirani | G08B 25/001 |
| 2013/0099919 A1* | 4/2013 | Cai | G01S 5/0009 |
| | | | 340/539.13 |
| 2014/0253317 A1* | 9/2014 | Wedig | G08B 25/00 |
| | | | 340/506 |
| 2014/0253326 A1* | 9/2014 | Cho | G08B 7/066 |
| | | | 340/539.13 |
| 2014/0293865 A1* | 10/2014 | Shi | G08B 21/10 |
| | | | 370/312 |
| 2015/0065078 A1* | 3/2015 | Mejia | H04M 11/04 |
| | | | 455/404.1 |
| 2015/0348220 A1* | 12/2015 | Sharma | G01C 21/3407 |
| | | | 705/324 |
| 2016/0049064 A1* | 2/2016 | McNabb | G08B 21/10 |
| | | | 340/540 |
| 2017/0032632 A1* | 2/2017 | Joseph | H04W 4/02 |
| 2017/0059343 A1* | 3/2017 | Spinelli | G01C 21/20 |
| 2019/0020978 A1* | 1/2019 | Finschi | G01S 1/68 |
| 2019/0066464 A1* | 2/2019 | Wedig | G08B 27/001 |
| 2019/0266860 A1* | 8/2019 | Lakshmipathy | G06K 9/00362 |
| 2019/0295397 A1* | 9/2019 | Eckert | G08B 15/00 |
| 2019/0353490 A1* | 11/2019 | Tadano | G01C 21/3461 |
| 2020/0388120 A1* | 12/2020 | Paturu | G08B 7/066 |

OTHER PUBLICATIONS

European Search Report for application EP 20211266.0, dated May 7, 2021, 27 pages.

* cited by examiner

METHOD AND A SYSTEM FOR DETERMINING SAFE EVACUATION PATH/S

FOREIGN PRIORITY

This application claims priority to Indian Patent Application No. 201911051254, filed Dec. 11, 2019, and all the benefits accruing therefrom under 35 U.S.C. § 119, the contents of which in its entirety are herein incorporated by reference.

TECHNICAL FIELD

The present invention generally relates to fire safety systems. More particularly, the invention relates to a system and a method for determining one or more safe evacuation paths in an event of fire inside premises.

BACKGROUND

During any fire/smoke breakouts in a building, safety of inhabitants of the building is of prime concern. Several measures are taken to ensure safety of the inhabitants during such breakouts. One such measure is the usage of a fire/smoke alarm system. In particular, a fire/smoke alarm gets activated and starts beeping when the fire/smoke alarm system detects fire/smoke in the building. The activation of the fire/smoke alarm informs people about the fire/smoke breakouts so that people present inside the building may vacate the building as soon as possible. Further, people present inside the building mostly use evacuation paths (such as stairs) provided in the building to escape the fire/smoke. In particular, the people may use a shortest or closest evacuation paths to come out of the building.

However, when people take the evacuation paths to come out of the building, they do not know about an actual or a real-time status of the evacuation paths in the event of fire/smoke. Also, the people do not know if the fire/smoke has entered in the evacuation paths and are safe to use or not. When designated evacuation paths are used by people in such a situation, it poses a huge risk to them as they may suffocate in the presence of fire/smoke present in these paths.

In view of the afore-mentioned problems, there is a need of an efficient and effective system and a method for preventing people from taking an evacuation path where fire/smoke has already entered/present. There is also a need to provide solution for guiding people about an evacuation path which is safe to use during a fire. In order to solve the problems in the existing solutions, a system and a method are disclosed.

SUMMARY

Various embodiments of the invention describe a system for determining one or more safe evacuation paths in fire event/s. The system comprises one or more detectors and a user device. The one or more detectors are positioned at each of a plurality of evacuation paths inside a premises. The one or more detectors comprises one or more sensors adapted to detect a parameter on an event of fire in the premises and a transmitter adapted to transmit measurements of the parameter to the user device. Further, the user device comprises a determination unit adapted to determine one or more safe evacuation paths from the plurality of evacuation paths inside the premises based on the measurements received from the one or more detectors. Moreover, the user device also comprises an interface adapted to display an indication of each of the one or more safe evacuation paths based on the determination.

In an embodiment of the invention, the transmitter is adapted to transmit the measurements of the parameter to a control panel.

In a different embodiment of the invention, the control panel transmits the measurements of the parameter to a server. The server further transmits the measurements of the parameter to the user device.

In an embodiment of the invention, the control panel transmits the measurements of the parameter to a server. The server determines one or more safe evacuation paths from the plurality of evacuation paths based on the measurements.

In another embodiment of the invention, the server transmits an indication of each of the one or more safe evacuation paths to a user device to display the indication on the interface.

In yet another embodiment of the invention, the determination unit is adapted to determine one or more unsafe evacuation paths from the plurality of evacuation paths inside the premises and the interface is adapted to display an indication of each of the one or more unsafe evacuation paths based on the determination.

In another embodiment of the invention, the one or more safe evacuation paths are determined if the measurements of the parameter are below a first pre-defined threshold. Also, the one or more unsafe evacuation paths are determined if the measurements of the parameter are above a second pre-defined threshold.

In still another embodiment of the invention, the one or more safe evacuation paths are indicated with a first color on the interface of the user device. Further, the one or more unsafe evacuation paths are indicated with a second color on the interface of the user device.

In a different embodiment of the invention, the one or more detectors transmit the measurements of the parameter to the user device through a Wi-Fi communication or a cellular communication.

In yet another embodiment of the invention, the user device receives an identifier associated with each of the one or more detectors and a location of each of the one or more detectors inside the premises.

In another embodiment of the invention, the one or more detectors are fire detectors, heat detectors or smoke detectors. Also, the parameter is a fire parameter, a heat parameter, and/or a smoke parameter.

Various embodiments of the invention describe a method for determining one or more safe evacuation paths in fire event/s. The method comprises steps of receiving measurements of parameter from one or more detectors. The one or more detectors detect parameter in an event of fire inside a premises and are positioned at each of a plurality of evacuation paths inside the premises. The method further comprises steps of determining one or more safe evacuation paths from the plurality of evacuation paths inside the premises based on the measurements of the parameter. Accordingly, an indication of each of the one or more safe evacuation paths is displayed on an interface of a user device based on the determination.

In an embodiment of the invention, the user device determines one or more unsafe evacuation paths from the plurality of evacuation paths inside the premises and the interface is adapted to display an indication of each of the one or more unsafe evacuation paths based on the determination.

In a different embodiment of the invention, the one or more safe evacuation paths are determined if the measurements of the parameter are below a first pre-defined threshold.

In yet another embodiment of the invention, the one or more unsafe evacuation paths are determined if the measurements of the parameter are above a second pre-defined threshold.

In an embodiment of the invention, the one or more safe evacuation paths are indicated with a first color on the interface of the user device and the one or more unsafe evacuation paths are indicated with a second color on the interface of the user device.

In another embodiment of the invention, the one or more detectors are fire detectors, heat detectors or smoke detectors, wherein the parameter is a fire parameter, a heat parameter, and/or a smoke parameter.

In another different embodiment of the invention, a computer readable medium is disclosed for determining one or more safe evacuation paths in fire event/s. The computer readable medium comprises one or more processors and a memory is coupled to the one or more processors, the memory stores instructions executed by the one or more processors. The one or more processors are configured to receive measurements of parameter from one or more detectors. The one or more detectors detect a parameter in an event of fire in a premises and are positioned at each of a plurality of evacuation paths inside the premises. The one or more processors are further configured to determine one or more safe evacuation paths from the plurality of evacuation paths in the premises based on the measurements of the parameter and display an indication of each of the one or more safe evacuation paths based on the determination.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION

Described herein is the technology with a system and a method for determining one or more safe evacuation paths in an event of fire. The one or more safe evacuation paths may be determined from a plurality of evacuation paths (or evacuation routes) present inside a premises. Such evacuation paths may be used by people present inside the premises when there is a fire or any such emergency occurring in the premises. Further, one or more detectors may also be installed in each of the plurality of evacuation paths. In an exemplary embodiment, in the event of fire in the premises, the detectors in each of the plurality of evacuation paths may detect parameter/s and may transmit measurements of the each of the parameter/s directly to a user device through a network for determining one or more safe evacuation paths. In a different exemplary embodiment, the detectors in each of the plurality of evacuation paths may transmit the measurements of the each of the parameter/s to a control panel and in turn, the control panel may transmit the measurements to a server. Then, the server/cloud may transmit the measurements of the each of the parameter/s to the user device for determining one or more safe evacuation paths. In an alternative exemplary embodiment, the detectors in each of the plurality of evacuation paths may transmit measurements of the parameter/s to the control panel and in turn, the control panel may transmit the measurements to the server, wherein the server may determine one or more safe evacuation paths.

When the user device receives the measurements of the parameter/s, the user device may determine one or more safe evacuation paths from the plurality of evacuation paths in the premises based on the measurements of the parameter/s. Specifically, the one or more evacuation paths may be determined to be safe to use when the measurements of the sensed parameter/s in the plurality of evacuation paths is below a first pre-defined threshold. The user device may display an indication of each of the one or more safe evacuation paths on an interface of the user device to inform people inside the premises for using the one or more safe evacuation paths. Alternatively, such a determination of the one or more safe evacuation paths may also be performed by the server and then the server may enable the user device to display indication of each of the one or more safe evacuation paths. In addition, the user device may also determine one or more unsafe evacuation paths from the plurality of evacuation paths in the premises when the measurements of the sensed parameter/s in the plurality of evacuation paths is above a second pre-defined threshold. The user device may also display an indication of each of the one or more unsafe evacuation paths on the interface. Alternatively, such a determination of the one or more unsafe evacuation paths may also be performed by the server. The server may enable the user device to display indication of each of the one or more unsafe evacuation paths.

As used herein, the premises may be a room, building, home, bank, office, mall, college, hospital and/or or any such premises having a plurality of evacuation paths where a fire event may occur. Further, the one or more detectors may also be located or positioned/installed at the plurality of evacuation paths inside the premises.

As used herein, the one or more detectors may be any such detector that is capable of detecting parameter/s inside the premises. The one or more detectors may comprise, but is not limited to, a transmitter, a receiver, sensor/s, a battery, a processor and/or a memory. The one or more detectors may be connected with the user device through a network. The one or more detectors may also be connected with a control panel through a wired network or a wireless network. The detectors may be an ionization smoke detector, a photoelectric or an optical smoke detector, carbon monoxide detector, an aspirating smoke detector (ASD), optical flame detectors, heat detector, fire detector or any such detector that is well known in the art. The parameter/s may be fire parameter, smoke parameter, gas parameter, heat parameter and/or any such parameter/s that is well known in the art.

As used herein, the user device may refer to a desktop computer or a hand-held device such as a smartphone with internet connectivity. The internet connectivity may be provided to the user device through a network. The user device may include, but is not limited to, a desktop, workstation PC, a laptop, a smart phone, a tablet, a personal digital assistance, a wearable device, or any such user device that is obvious to a person skilled in the art.

As used herein, the server has processing capabilities as disclosed further in the specification. The server may be a cloud storage, a remote database, or any such storage known in the art.

As used herein, the network may refer to a wired network, a mesh network, a cellular network (such as Global System for Mobile (GSM) network, a Long-Term Evolution (LTE) network, a code-division multiple access (CDMA) network, a narrow-band internet of thing (NB-IoT) technique or category M1 technique)), a short-range network (a bluetooth network, a WiFi network, or a ZigBee network) or any such network/technique that is known in the art.

Throughout the specification, reference numeral 104 depicts each of a plurality of evacuation paths. Each of the reference numerals 104A, 104B, 104C may be considered as a single evacuation path. Likewise, throughout the specification, reference numeral 106 depicts each of one or more detectors. Each of the reference numerals 106A-106L may be considered as a single detector.

Figure 1A:
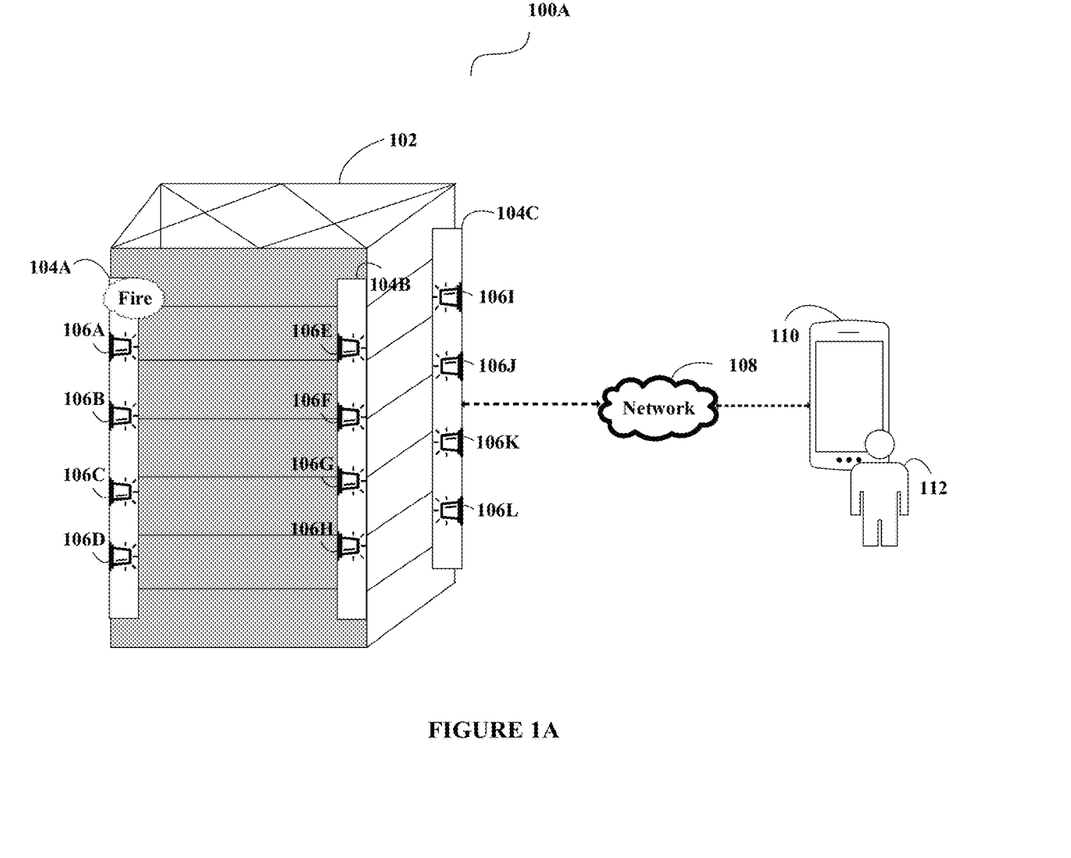
FIG. 1A depicts an exemplary system architecture according to an exemplary embodiment of the invention.

FIG. 1A depicts an exemplary system architecture 100A according to an exemplary embodiment of the invention. As depicted in FIG. 1A, a premises 102 may have a plurality of evacuation paths, namely, a first evacuation path 104A, a second evacuation path 104B, and a third evacuation path 104C. As an example, the first evacuation path 104A may have 4 detectors 106A, 106B, 106C and 106D. Similarly, the second evacuation path 104B may have 4 detectors 106E, 106F, 106G and 106H. Likewise, the third evacuation path 104C may have 4 detectors 106I, 106J, 106K and 106L. In an event of fire occurs in the premises 102, each of one or more detectors 106 positioned/installed at each of the plurality of evacuation paths 104 may detect parameter/s (such as heat, fire, smoke, gas etc.) inside each of the plurality of evacuation paths 104. Also, each of the one or more detectors 106 may evaluate a measurement/reading of the detected parameter/s.

Considering an exemplary Table 1 below showing the measurements of fire parameter evaluated by each of the one or more detectors 106.

TABLE 1

| Evacuation Path 104A | | Evacuation Path 104B | | Evacuation Path 104C | |
| --- | --- | --- | --- | --- | --- |
| Detector | Fire Intensity | Detector | Fire Intensity | Detector | Fire Intensity |
| Detector 106A | 50 | Detector 106E | 30 | Detector 106I | 5 |
| Detector 106B | 48 | Detector 106F | 30 | Detector 106J | 4 |
| Detector 106C | 46 | Detector 106G | 29 | Detector 106K | 4 |
| Detector 106C | 44 | Detector 106H | 29 | Detector 106L | 3 |

The intensity of fire may be measured in KW/m2 unit. The values used in Table 1 and the specification are exemplary and any other modification in the values are within the scope of this invention. Although the exemplary Table 1 above shows measurement of fire parameter; however, any other parameter (such as heat, smoke, gas etc.) are within the scope of the invention.

The one or more detectors 106 may transmit the measurements of the detected parameter/s to a user device 110 through a Wi-Fi communication channel or a cellular communication channel of a network 108. For such communication, each of the one or more detectors 106 and the user device 110 may have Wi-Fi capability or cellular capability. The user device 110 may receive the measurements of the parameter/s from the each of the one or more detectors 106. The user device 110 may determine one or more safe evacuation paths from the plurality of evacuation paths 104 if the measurements of the parameter/s are below a first pre-defined threshold. The user device 110 may also determine one or more unsafe evacuation paths from the plurality of evacuation paths 104 if the measurements of the parameter/s are above a second pre-defined threshold. For this, user device 110 may compare the measurements of the parameter/s with a first pre-defined threshold. When the user device 110 determines that the measurements of the parameter/s (received from each of the one or more detectors 106) are below the first pre-defined threshold, then the user device 110 may consider one or more evacuation paths 104 as safe evacuation paths. In addition, the user device 110 may also compare the measurements of the parameter/s with a second pre-defined threshold. When the user device 110 determines that the measurements of the parameter/s are above the second pre-defined threshold, then the user device 110 may consider one or more evacuation paths 104 as unsafe evacuation paths. As used herein, the first pre-defined threshold and/or the second pre-defined threshold may be defined by a manufacturer of the detectors 106, a manufacturer of the control panel 114, and/or a technician or a building management team of the premises 102.

As an example, consider that the first pre-defined threshold is 10 (minimum value) and/or the second pre-defined threshold is 25 (maximum value). When the user device 110 compares the measurements of the fire parameter (as provided in exemplary Table 1) with the first pre-defined threshold (i.e. 10) and/or the second pre-defined threshold (i.e. 25), then, the user device 110 may determine that the evacuation path 104C can be considered as a safe evacuation path. This is because the measurements of the fire parameter from the Detectors 106I, 106J, 106K and 106L (of the evacuation path 104C) are below the first pre-defined threshold (i.e. 10) and also not above the second pre-defined threshold (i.e. 25). Similarly, the user device 110 may determine that the evacuation path 104B and the evacuation path 104A can be considered as unsafe evacuation paths. This is because the measurements of the fire parameter from the Detectors 106A, 106B, 106C and 106D (of the evacuation path 104A) and Detectors 106E, 106F, 106G and 106H (of the evacuation path 104B) above the first pre-defined threshold (i.e. 10) and also above the second pre-defined threshold (i.e. 25).

After the user device 110 determines the one or more safe evacuation paths (i.e. 104C) and/or the one or more unsafe evacuation paths (104A & 104B), the user device 110 may display an indication of each of the one or more safe evacuation paths (i.e. 104C) and/or the one or more unsafe evacuation paths (104A & 104B) on an interface of the user device 110. In an exemplary embodiment, the one or more safe evacuation paths (i.e. 104C) may be indicated with a first color on the interface of the user device 110. In another exemplary embodiment, the one or more unsafe evacuation paths (104A & 104B) may be indicated with a second color on the interface of the user device 110. In other words, two different colors may be used to indicate safe and unsafe evacuation paths. This embodiment of the invention provides a technical advantage of helping the user 112 to easily know about the fire presence in the each of evacuation paths 104. Moreover, a user 112 of the user device 110 may use the displayed indication of each of the one or more safe evacuation paths (i.e. 104C) and/or the one or more unsafe evacuation paths (104A & 104B) to escape the premises 102. Alternatively, the user 112 may further broadcast information about the safe evacuation paths (i.e. 104C) and/or the unsafe evacuation paths (104A & 104B) to other people present in the premises 102. This embodiment of the invention provides a technical advantage of preventing people from taking the unsafe evacuation path 104A & 104B where the fire/smoke has already entered/present.

Figure 1B:
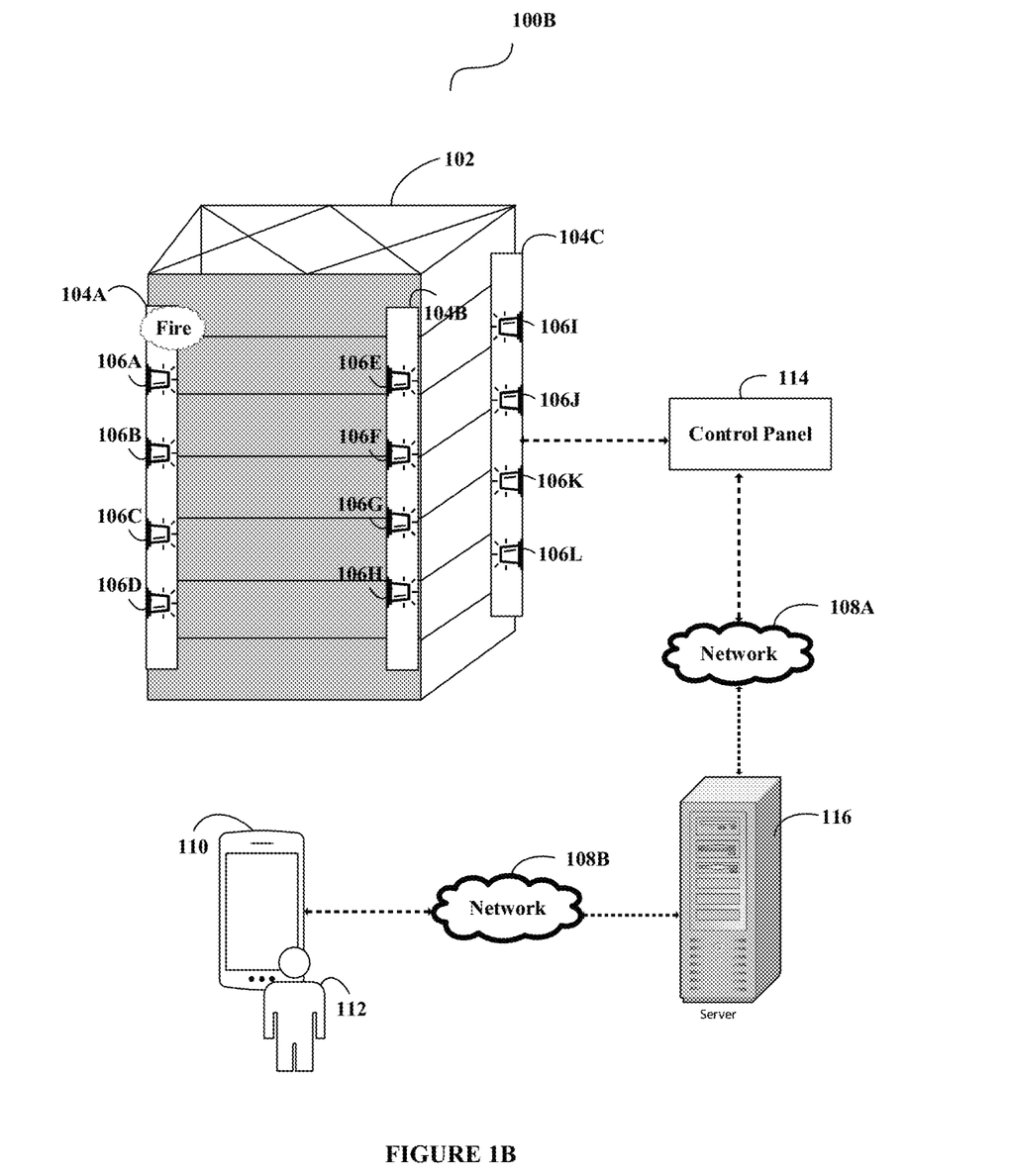
FIG. 1B depicts an exemplary system architecture according to an alternative exemplary embodiment of the invention.

FIG. 1B depicts an exemplary system architecture 100B according to an exemplary alternative embodiment of the invention. In an event of fire inside a premises 102, one or more detectors 106 positioned/installed in each of a plurality of evacuation paths 104 may detect parameter/s (such as heat, fire, smoke, gas etc.) in each of the plurality of the evacuation paths 104 as explained above in FIG. 1A. In this exemplary alternative embodiment of the invention, each of the one or more detectors 106 may transmit the measurements of the detected parameter/s to a control panel 114 through a wired network or a wireless network (such as cellular network or short-range network). The control panel 114 may in turn transmit the measurements of the parameter/s to a server 116 through a network 108A. When the server 116 receives the measurements of the parameter/s, the server 116 may either itself determine one or more safe evacuation paths from the plurality of evacuation paths 104 or may transmit the measurements of the parameter/s to a user device 110 through a network 108B for determining the one or more safe evacuation paths from the plurality of evacuation paths 104. In the latter case, the user device 110 may determine the one or more safe evacuation paths as explained in FIG. 1A above.

In order to determine the one or more safe evacuation paths, the server 116 may employ and use the same technique as explained in FIG. 1A with Table 1 above and as used by the user device 110 to perform such determination. After the server 116 determines the one or more safe evacuation paths (i.e. 104C) and/or the one or more unsafe evacuation paths (104A & 104B), the server 116 may transmit an indication of each of the determined one or more safe evacuation paths (i.e. 104C) and/or the determined one or more unsafe evacuation paths (104A & 104B) to the user device 110 through the network 108B. It is to be noted that the control panel 114 may also have the capability to determine one or more safe evacuation paths and/or unsafe evacuation paths as described herein. In such a case, the control panel 114 may transmit the indication of the determined safe and unsafe evacuation paths to the user device 110.

The user device 110 may receive the indication of each of the one or more safe evacuation paths (i.e. 104C) and/or the one or more unsafe evacuation paths (104A & 104B) from the server 116 through the network 108B. The user device 110 may also display the indication of each of the one or more safe evacuation paths (i.e. 104C) and/or the one or more unsafe evacuation paths (104A & 104B) on an interface of the user device 110. A user 112 of the user device 110 may use the displayed indication of each of the one or more safe evacuation paths (i.e. 104C) and/or the one or more unsafe evacuation paths (104A & 104B) to use the safe evacuation paths (i.e. 104C) to escape the premises 102. In an exemplary embodiment, the one or more safe evacuation paths (i.e. 104C) may be indicated with a first color on the interface of the user device 110. In another exemplary embodiment, the one or more unsafe evacuation paths (104A & 104B) may be indicated with a second color on the interface of the user device 110. In other words, two different colors may be used to indicate safe and unsafe evacuation paths. Using more than two colors to show multiple paths based on the determination in different situations on the user device 110 is within the scope of the invention. This embodiment of the invention provides a technical advantage of helping the user 112 to easily know about the fire presence in the each of evacuation paths 104.

The present invention encompasses an application stored in the user device 110 to display the indication of each of the safe evacuation path/s (104C) and/or the unsafe evacuation path/s (104A & 104B). Such an application may have a pre-stored map of the premises 102 to display the indication of safe evacuation path/s (104C) and/or the unsafe evacuation path/s (104A & 104B) on the pre-stored map. Further, the application may also be pre-configured with at least an identifier and a location associated with each of the one or more detectors 106 positioned at the plurality of evacuation paths 104 inside the premises 102. Furthermore, each of the one or more detectors 106 may also transmit its identifier along with the measurements of the parameter/s to the user device 110. Accordingly, the user device 110 may use the identifier and/or the location associated with each of the one or more detectors 106 to display the indication of each of the safe evacuation path/s (104C) and/or the unsafe evacuation path/s (104A & 104B). The application stored on the user device is executed to perform the determination and/or display of the safe/unsafe evacuation paths inside the premises.

Although the FIGS. 1A and 1B shows three evacuation paths with four detectors 106 positioned at each of the three evacuation paths 104 present inside a premises 102; however, it is understood for a person skilled in the art that any number of evacuation paths having any number of detectors may be present inside the premises. The FIGS. 1A and 1B shows three networks 108A, 108B and 108 and it is understood for a person skilled in the art that these networks may be same networks or different networks.

Figure 2:
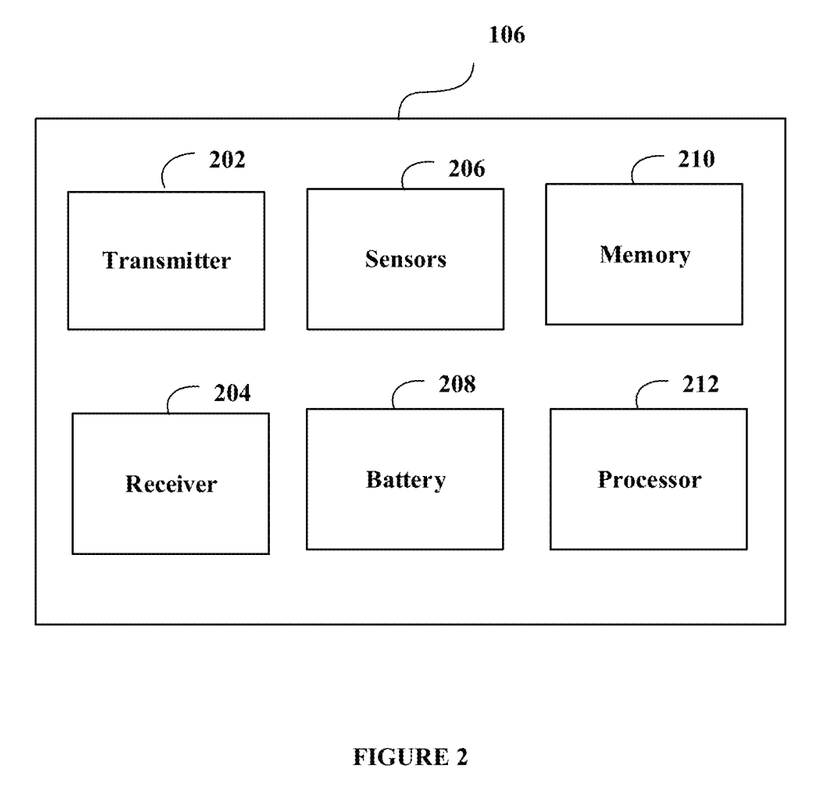
FIG. 2 depicts block diagram of different components of an exemplary detector according to an exemplary embodiment of the invention.

FIG. 2 depicts block diagram of different components of an exemplary detector 106 according to an exemplary embodiment of the invention. The detector 106 may comprise of, but is not limited to, a transmitter 202, a receiver 204, one or more sensors 206, a battery 208, a memory 210 and/or a processor 212. The one or more sensors 206 may be adapted to detect parameter/s in each of a plurality of evacuation paths 104 in an event of fire inside a premises 102. The one or more sensors 206 may communicate measurements of each of the parameter/s to the transmitter 202. The transmitter 202 may be adapted to transmit measurements of each of the parameter/s to a user device 110 (as per FIG. 1A) or a control panel 114 (as per FIG. 1B). The receiver 204 may be adapted to receive a command from the user device 110 or the control panel 114 to perform an operation. The battery 208 may be adapted to provide power to the detector 106. The memory 210 may be adapted to store the measurements of each of the parameter/s, an identifier of the control panel 114, an identifier of the user device 110 and/or an identifier of the detector 106. Moreover, the transmitter 202, the receiver 204, the one or more sensors 206, the battery 208, the memory 210 may be communicably coupled with the processor 212. The different units described herein are exemplary. The invention may be performed using one or more units. For example, the tasks executed by the transmitter 202, the receiver 204, the one or more sensors 206, the battery 208, the memory 210 and/or the processor 212 may be performed by a single unit. Alternatively, more number of units as described herein may be used to perform the present invention.

Figure 3:
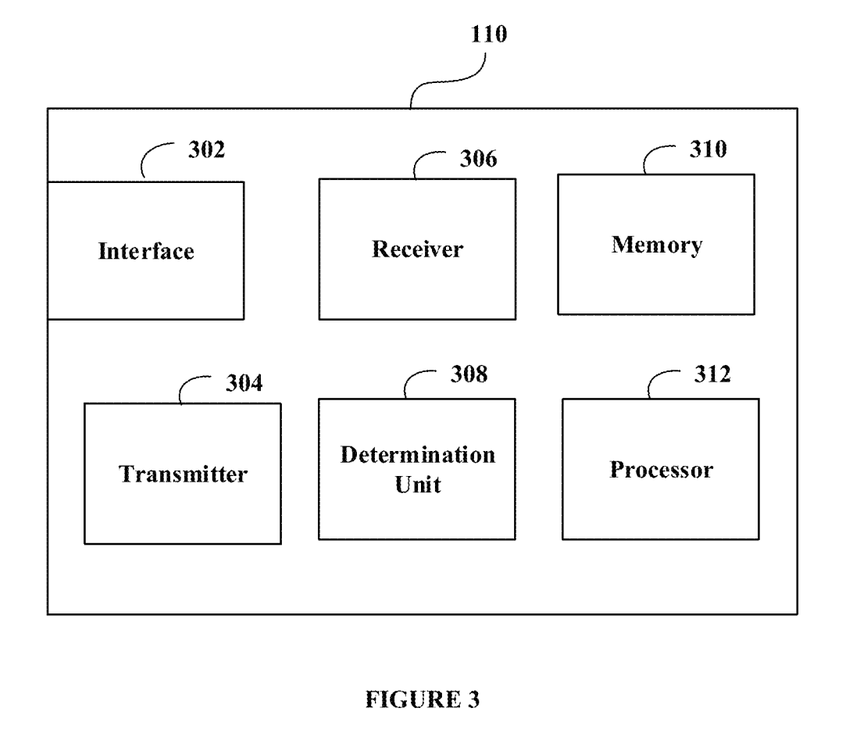
FIG. 3 depicts block diagram of different components of an exemplary user device according to an exemplary embodiment of the invention.

FIG. 3 depicts block diagram of different components of an exemplary user device 110 according to an exemplary embodiment of the invention. The user device 110 may comprise of, but is not limited to, an interface 302, a transmitter 304, a receiver 306, a determination unit 308, a memory 310 and/or a processor 312. The receiver 306 may be adapted to receive measurements of each of the parameter/s from one or more detectors 106 through a Wi-Fi communication channel or a cellular communication channel of a network 108. The receiver 306 may communicate the measurements to the determination unit 308. The determination unit 308 may be adapted to determine safe evacuation path/s and/or unsafe evacuation path/s from a plurality of evacuation paths 104. The determination unit 308 may communicate an indication of each of the safe evacuation path/s and/or unsafe evacuation path/s to the interface 302. The interface 302 may be adapted to display the indication of each of the safe evacuation path/s and/or unsafe evacuation path/s on the user device 110. The transmitter 304 may be adapted to transmit a command to the one or more detectors 106 or a server 116. The memory 310 may be adapted to store application/s, the measurements of each of the parameter/s, the indication of each of the safe evacuation path/s and/or unsafe evacuation path/s. Moreover, the interface 302, the transmitter 304, the receiver 306, the determination unit 308, the memory 310 may be communicably coupled with the processor 312. The different units described herein are exemplary. The invention may be performed using one or more units. For example, the tasks executed by the interface 302, the transmitter 304, the receiver 306, the determination unit 308, the memory 310 and/or the processor 312 may be performed by a single unit. Alternatively, more number of units as described herein may be used to perform the present invention.

Figure 4:
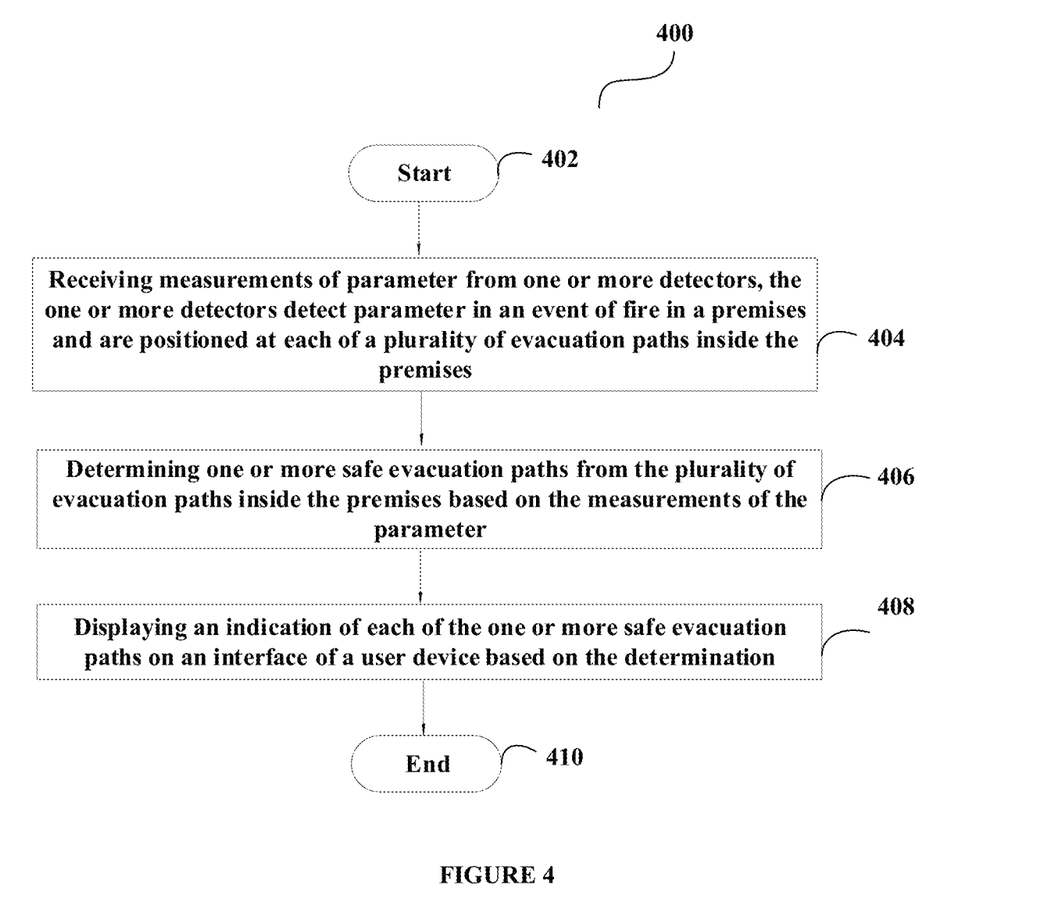
FIG. 4 depicts an exemplary flowchart illustrating a method to perform the invention according to an exemplary embodiment of the invention.

FIG. 4 depicts a flowchart outlining the features of the invention in an exemplary embodiment of the invention. The method flowchart 400 describes a method being for determining one or more safe evacuation paths in an event of fire. The method flowchart 400 starts at step 402.

At step 404, a user device 110 may receive measurements of parameter/s from one or more detectors 106. The one or more detectors 106 may detect parameter/s in an event of fire in a premises 102 and may be positioned at each of plurality of evacuation paths 104 inside the premises 102. This has been discussed in greater details in FIG. 1A and FIG. 1B.

At step 406, the user device 110 may determine one or more safe evacuation paths from the plurality of evacuation paths 104 inside the premises 102 based on the measurements of the parameter/s. This has been discussed in greater details in FIG. 1A and FIG. 1B.

At step 408, the user device 110 may display an indication of each of the one or more safe evacuation paths 104C on an interface of the user device 110 based on the determination. This has been discussed in greater details in FIG. 1A and FIG. 1B. Then, the method flowchart 400 may end at 410.

The present invention is applicable in various industries/fields such as, but not limited to, banking industry, hospitality industry, housing industry, building/construction industry, offices, universities, hospitals, colleges, homes and any such industry/field that is well known in the art and where fire may occur.

The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a user device 110. A computer readable medium comprises one or more processors and a memory coupled to the one or more processors, the memory stores instructions executed by the one or more processors. The one or more processors configured to receive measurements of a parameter/s from one or more detectors 106. The one or more detectors 106 detect parameter/s in an event of fire in a premises 102 and are positioned at each of plurality of evacuation paths 104 inside the premises 102. The one or more processors also configured to determine one or more safe evacuation paths 104C from the plurality of evacuation paths 104 in the premises 102 based on the measurements of the parameter/s. The one or more processors also configured to display an indication of each of the one or more safe evacuation paths 104C based on the determination.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   one or more detectors positioned at each of a plurality of evacuation paths inside a premises, wherein the one or more detectors are fire detectors, heat detectors or smoke detectors, and the parameter is a fire parameter, a heat parameter, and/or a smoke parameter, the one or more detectors comprising:
   one or more sensors adapted to detect a parameter in an event of fire in the premises; and
   a transmitter adapted to transmit measurements of the parameter to a hand-held, portable user device; and
   the user device comprising:
   a determination unit adapted to determine one or more safe evacuation paths from the plurality of evacuation paths inside the premises based on the measurements received from the one or more detectors; and
   an interface adapted to display an indication of each of the one or more safe evacuation paths based on the determination;
   the determination unit is further adapted to determine one or more unsafe evacuation paths from the plurality of evacuation paths inside the premises and the interface is further adapted to display an indication of each of the one or more unsafe evacuation paths based on the determination;
   wherein the one or more safe evacuation paths are determined if the measurements of the parameter are below a first pre-defined threshold, and the one or more unsafe evacuation paths are determined if the measurements of the parameter are above a second pre-defined threshold.

2. The system of claim 1, wherein the transmitter is adapted to transmit the measurements of the parameter to a control panel.

3. The system of claim 2, wherein the control panel transmits the measurements of the parameter to a server, wherein the server transmits the measurements of the parameter to the user device.

4. The system of claim 2, wherein the control panel transmits the measurements of the parameter to a server, wherein the server determines one or more safe evacuation paths from the plurality of evacuation paths based on the measurements.

5. The system of claim 4, wherein the server transmits an indication of each of the one or more safe evacuation paths to a user device to display the indication on the interface.

6. The system of claim 1, wherein the one or more safe evacuation paths are indicated with a first color on the interface of the user device.

7. The system of claim 1, wherein the one or more unsafe evacuation paths are indicated with a second color on the interface of the user device.

8. The system of claim 1, wherein the one or more detectors transmit the measurements of the parameter to the user device through a Wi-Fi communication or a cellular communication.

9. The system of claim 1, wherein the user device receives an identifier associated with each of the one or more detectors and a location of each of the one or more detectors inside the premises.

10. A method comprising:
    receiving measurements of parameter from one or more detectors, wherein the one or more detectors are fire detectors, heat detectors or smoke detectors, and the parameter is a fire parameter, a heat parameter, and/or a smoke parameter, the one or more detectors detect parameter in an event of fire inside a premises and are positioned at each of a plurality of evacuation paths inside the premises;
    determining one or more safe evacuation paths from the plurality of evacuation paths inside the premises based on the measurements of the parameter; and
    displaying an indication of each of the one or more safe evacuation paths on an interface of a hand-held, portable user device based on the determination
    wherein the one or more safe evacuation paths are determined if the measurements of the parameter are below a first pre-defined threshold;
    wherein the user device determines one or more unsafe evacuation paths from the plurality of evacuation paths inside the premises and the interface is adapted to display an indication of each of the one or more unsafe evacuation paths based on the determination;
    wherein the one or more unsafe evacuation paths are determined if the measurements of the parameter are above a second pre-defined threshold.

11. The method of claim 10, wherein the one or more safe evacuation paths are indicated with a first color on the interface of the user device and the one or more unsafe evacuation paths are indicated with a second color on the interface of the user device.

12. A computer readable medium comprising one or more processors and a memory coupled to the one or more processors, the memory storing instructions executed by the one or more processors, the one or more processors configured to perform the method of claim 10.

* * * * *